United States Patent [19]

Mori et al.

[11] 4,107,272

[45] Aug. 15, 1978

[54] PROCESS FOR REMOVING NITROGEN OXIDES USING AMMONIA AS A REDUCTANT AND SULFATED METALLIC CATALYSTS

[75] Inventors: Toshikatsu Mori, Hitachi; Masato Takeuchi, Katsuta; Otane Hitomi, Hitachi; Shigeo Uno, Hitachi; Jinichi Imahashi, Hitachi; Fumito Nakajima, Hitachi, all of Japan

[73] Assignee: Hitachi, Ltd., Japan

[21] Appl. No.: 762,267

[22] Filed: Jan. 25, 1977

Related U.S. Application Data

[63] Continuation of Ser. No. 471,151, May 17, 1974, abandoned.

[30] Foreign Application Priority Data

May 21, 1973 [JP] Japan .................... 48-57080

[51] Int. Cl.$^2$ .................... B01J 8/00; C01B 21/00
[52] U.S. Cl. .................... 423/239; 252/440; 423/237; 423/351
[58] Field of Search .............. 423/235, 239, 351, 237; 252/466 J, 440

[56] References Cited

U.S. PATENT DOCUMENTS

| | | | |
|---|---|---|---|
| 1,412,452 | 4/1922 | Coolbaugh | 423/244 |
| 1,422,211 | 7/1922 | Lamb | 423/239 |
| 2,924,504 | 2/1960 | Reitmeier | 423/213 |
| 3,382,033 | 5/1968 | Kitagawa | 423/239 |
| 3,449,063 | 6/1969 | Geitting | 423/213 |
| 3,635,657 | 1/1972 | Bressan | 423/235 |
| 3,682,585 | 8/1972 | Frevel | 423/239 |
| 3,773,912 | 11/1973 | Spangler | 423/237 |
| 3,795,730 | 3/1974 | Kalvinskas | 423/213.5 |
| 3,864,451 | 2/1975 | Lee | 423/239 |
| 3,993,731 | 11/1976 | Morikawa et al. | 423/239 A |

FOREIGN PATENT DOCUMENTS

| | | | |
|---|---|---|---|
| 804,316 | 2/1974 | Belgium | 423/239 |
| 804,317 | 2/1974 | Belgium | 423/239 |
| 1,504,331 | 1/1967 | France | 423/239 |

OTHER PUBLICATIONS

Perry–Chem. Engr. Handbook – 4th Ed. – McGraw Hill – 1963, pp. 3–10, 3–11, 3–14.

*Primary Examiner*—O. R. Vertiz
*Assistant Examiner*—Eugene T. Wheelock
*Attorney, Agent, or Firm*—Craig & Antonelli

[57] ABSTRACT

Nitrogen oxides are removed from flue gas evolving from stationary sources and containing the nitrogen oxides through reduction of nitrogen oxides to nitrogen by passing the flue gas over a catalyst of metal compounds containing oxysulfur compounds in the presence of an ammonia gas.

20 Claims, 4 Drawing Figures

PROCESS FOR REMOVING NITROGEN OXIDES USING AMMONIA AS A REDUCTANT AND SULFATED METALLIC CATALYSTS

This application is a continuation of our prior U.S. application, Ser. No. 471,151, filed May 17, 1974, now abandoned.

BACKGROUND OF THE INVENTION

1. Field of the Invention

This invention relates to a process for removing nitrogen oxides from boiler flue gas, nitric acid plant effluent gas, steel-making plant flue gas, etc., evolving from stationary sources such as fossil fuel-fired power stations, chemical factories, etc. through reduction of the nitrogen oxides to nitrogen.

2. Description of the Prior Art

One of processes for removing nitrogen oxides, which will be hereinafter referred to as "$NO_x$", from flue gas is a reduction process, where the flue gas is treated with various reducing agents to convert $NO_x$ to harmless nitrogen. An advantage of the process is non-production of by-products. The reduction process is further subdivided into two groups. One groups is the so-called direct reduction method, wherein the flue gas is treated with a reducing agent at a high temperature without using any catalyst, and another is the so-called catalytic reduction method, where the reduction is carried out with a catalyst. The direct reduction method is carried out at a temperature of 600° C or higher for treating $NO_x$, and therefore heat must be supplied from outside to treat a flue gas evolving at a temperature below said treating temperature as in the case of the boiler flue gas from power stations. The catalytic reduction method can be carried out at a lower temperature than that of the direct reduction method, and therefore the catalytic reduction method is most suitable for treating the flue gas at a temperature below 350° to 400° C, as in the case of the flue gas from power stations and industrial boilers.

Reducing agents used in the catalytic reduction method include hydrogen, carbon monoxide, hydrocarbons such as methane, propane, etc., ammonia, etc. When the reducing agent is an ammonia gas, ammonia selectively reacts with the nitrogen oxides in the flue gas. Therefore, it seems that, when a flue gas containing oxygen such as a boiler flue gas, etc. is treated according to the catalytic reduction method, it is most suitable to use ammonia as the reducing agent. The effect of the catalytic reduction method using ammonia as the reducing agent entirely depends upon a catalyst. The catalyst usually used in the catalytic reduction method is a catalyst of the platinum group such as platinum, palladium, etc. However, it is not suitable to use a catalyst of the platinum group in reducing boiler flue gas by ammonia. That is, the boiler flue gas contains sulfur oxides such as $SO_2$ and $SO_3$, oxygen, carbon dioxide, steam, etc. in addition to nitrogen oxides ($NO_x$), and the catalyst is poisoned by the sulfur oxides, and the activity of the catalyst is lowered. Furthermore, the catalyst of the platinum group is expensive, and especially when a larger amount of the catalyst is required, as in the case of the treatment of the boiler flue gas, the catalyst of the platinum group is economically disadvantageous.

SUMMARY OF THE INVENTION

An object of the present invention is to provide a process for catalytic reduction of $NO_x$ contained in the flue gas in the presence of ammonia, where a catalyst is never poisoned by other components contained in the flue gas for a long period of time.

Another object of the present invention is to provide a process for making nitrogen oxides harmless, which is applicable to a considerably large amount of flue gas, such as a boiler flue gas from a power station.

That is to say, the present invention provides a process for making nitrogen oxides contained in a flue gas harmless by contacting $NO_x$ contained in the flue gas with a catalyst consisting mainly of oxysulfur compounds of vanadium, chromium, manganese, iron, copper and nickel in the presence of ammonia.

In other words, the present invention provides a process for removing nitrogen oxides from a flue gas containing the nitrogen oxides by contacting $NO_x$ contained in the flue gas with a catalyst consisting mainly of oxysulfur compounds containing oxysulfur group such as $SO_4^{--}$, $SO_3^{--}$, $S_2O_7^{--}$, $HSO_4^{-}$, $HSO_3^{-}$, etc. in the presence of ammonia.

DESCRIPTION OF THE PREFERRED EMBODIMENT

Figure 1:
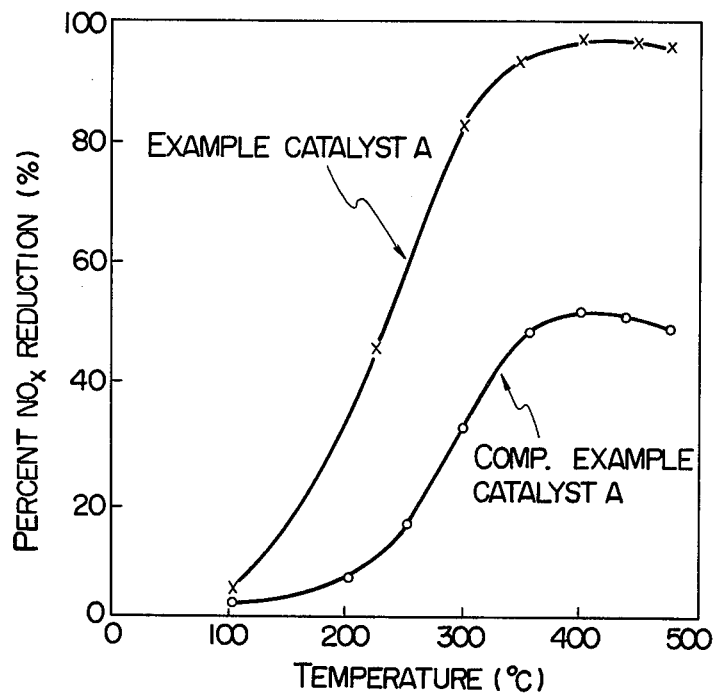
FIG. 1 is a diagram showing the relations between a flue gas temperature and percent $NO_x$ reduction of the catalyst used in the present invention and that of the prior art.

The present invention is directed to treatment mainly of a flue gas evolving from stationary sources. The flue gas from the stationary sources, which set up stringent conditions on catalysts, is a flue gas resulting from combustion of fossil fuel, for example, the flue gas from power stations, industrial boilers, etc. The flue gas has such a composition as 200 to 1,500 ppm in volume of sulfur oxides (mainly $SO_2$), 8 to 15% by volume of carbon dioxide, 1 to 7% by volume of oxygen, 5 to 15% by volume of steam, 100 to 1,000 ppm in volume of nitrogen oxides (mainly NO), etc. For the catalysts for treating such flue gas, it is required that the catalysts are not poisoned by the sulfur oxides in addition to a high catalytic activity and a high gas-treating capacity. Further, the flue gas contains sulfur oxides, nitrogen oxides and oxygen, which can react with a reducing agent. When hydrogen, carbon or hydrocarbon is used as the reducing agent, oxygen undergoes reaction in preference to the nitrogen oxides. On the other hand, ammonia reacts with nitrogen oxides faster than with sulfur oxides or oxygen, and therefore can selectively reduce the nitrogen oxides. Thus, ammonia is the most suitable reducing agent for reducing only nitrogen oxides among a number of reducible components, as in the case of the boiler flue gas.

Equivalent relation for reducing NO of the nitrogen oxides with ammonia is that 3 moles of NO requires 2 moles of ammonia, and that for $NO_2$ is that 3 moles of $NO_2$ requires 4 moles of ammonia. However, the most portion of $NO_x$ in the boiler flue gas is in the form of NO, and therefore it is necessary that ammonia is added to $NO_x$ in a molar ratio of ammonia to $NO_x$ of two-thirds or more. For other flue gases, the amount of ammonia to be added must be determined by a composition ratio of NO to $NO_2$. An increased amount of ammonia advantageously permits to increase a space velocity in the catalyst used in the present invention. Excessively increased amount of ammonia makes ammonia remain in the flue gas after the treatment, and ammonia is discharged into the atmosphere from a stack. To prevent the discharge of ammonia, such flue gas must be subjected to a post-treatment.

Increased space velocity permits to reduce a volume of a catalytic reactor. That is to say, the apparatus can be made compact, resulting in reduction in the apparatus cost. However, excessively increased space velocity brings about a larger pressure drop throughout the catalytic reactor, and therefore the space velocity must be kept in an appropriate range. The space velocity is never limited in the present invention, but it is preferable to keep the space velocity in a range of 1,000 to 100,000 $hr^{-1}$, though it depends upon the treating temperature, and the amount of ammonia to be added. $NO_x$ can be efficiently made harmless within that range. In the present invention, an equivalent relation is established in the catalytic reduction of $NO_x$ with ammonia under conditions of a space velocity of 10,000 $hr^{-1}$ and a catalyst layer temperature of 350° C, and in that case percent $NO_x$ reduction of 80% or more can be obtained.

The present inventors have found that a catalyst comprising ions having a chemical formula, $SO_x$, wherein $x$ is 1.5 to 4, and metallic ions or metal elements having a catalytic action can attain a good percent $NO_x$ reduction in the reaction under said conditions.

The catalyst used under said conditions comprises at least sulfur compounds or ions having a chemical formula, $SO_x$, wherein $x$ is 1.5 to 4, and a metal element or its ion.

The oxysulfur compounds used in the present invention mean compounds containing sulfate ion, bisulfate ion, sulfite ion, acidic bisulfite ion, thiosulfate ion, pyrosulfate ion, etc. and these ions can be represented by the chemical formula, $SO_x$, where $x$ is 1.5 to 4.

The oxysulfur compounds may be metal salts or compounds containing no metal. The metal may be combined with said oxysulfur compounds, or may be contained in the oxysulfur compounds in a form of metal element or metallic ion. The metal component is at least one of elements or ions selected from vanadium, chromium, manganese, iron, copper, and nickel, and can be obtained even from the compounds containing such ions as $SO_4^{--}$, $SO_3^{--}$, $HSO_4^-$, $HSO_3^-$, $S_2O_7^{--}$, $S_2O_3^{--}$, etc. as a starting material. Therefore, a large variety of starting materials can be used.

Oxysulfur compounds, for example, of iron include those containing iron and sulfate ion, such as ferrous sulfate, ferric sulfate, ferrous ammonium sulfate (Mohr's salt), etc.

Other metal components of the catalyst composition than said iron, for example, chromium, manganese, vanadium and nickel, can increase a reduction activity, if they are contained in the oxysulfur compounds.

Even if the metal component is in the form of non-oxysulfur compound, a similar effect can be obtained, so long as the metal component of non-oxysulfur compound is used together with a non-metal oxysulfur compound.

The non-oxysulfur compounds used in the present invention include nitrates, carbonates, chlorides, etc. The non-metal oxysulfur compounds used in the present invention are such oxysulfur compounds as sulfuric acid, sulphurous acid, ammonium sulfate, ammonium bisulfate, ammonium sulfite, ammonium bisulfite, ammonium thiosulfate, etc.

Furthermore, in the present invention, it is possible to mix the metal salt of the non-oxysulfur compound with that of the oxysulfur compound. Furthermore, aluminum sulfate, aluminum bisulfate, aluminum thiosulfate, aluminum sulfite, etc. can be used together with the non-oxysulfur compound.

The mode of the catalysts of the present invention can be given in combination of the starting material and preparation procedure, where M stands for a metal atom of the catalyst, $SO_x$ an ion of the oxysulfur compound, A other cation than M, and Y other anion than $SO_x$.

(1) M + $SO_x$
(2) M + $ASO_x$
(3) M + MY + $ASO_x$
(4) MY + $ASO_x$
(5) $MSO_x$
(6) $MSO_x$ + M
(7) $MSO_x$ + M + MY
(8) $MSO_x$ + MY
(9) $MSO_x$ + $ASO_x$
(10) $MSO_x$ + $ASO_x$ + M
(11) $MSO_x$ + $ASO_x$ + MY
(12) $MSO_x$ + $ASO_x$ + MY + M

The catalyst used in the present invention can be carried on porous, heat-resistant oxides. The porous, heat-resistant oxides as carriers are preferably alumina, silica, alumina-silica, zirconia, activated alumina, etc.

The carriers may be in a powdery form or shaped form. In the case the carriers are in a shaped form, any shape, for example, columnar, cylindrical, spherical, or crushed form can be used. The size of the carriers depends upon the size of the apparatus, space velocity of flue gas, pressure drop, etc., but usually it is preferable to use the carriers having sizes of 1 to 30 mm.

Advantages of carrying the catalyst component on the carriers are an increase in the heat resistance of the catalyst, maintenance of the catalytic activity at the same level even if the amount of the catalyst component is reduced, and an increase in mechanical strength.

The catalyst can be readily prepared according to the ordinary procedure, for example, by kneading, precipitation, impregnation, etc. Final shaped catalysts can be prepared according to any shaping procedure, for example, by ordinary extrusion, tableting, rotary pan granulation, etc., depending upon the desired object.

For example, when the starting materials are insoluble in water, the starting materials can be mixed with the powders of carriers, shaped, and calcined. Further, it is possible to mix only the powders of the starting materials, and shape and sinter the resulting mixture. When the starting materials are soluble in water, the catalyst components are made to precipitate by using a precipitator as the powders of the carriers, and filtered. The cakes are shaped and then calcined to obtain the shaped catalysts. When the carriers are in a shaped form, the catalyst components are made to deposit on the carriers together with the precipitator, and the resulting catalyst component-deposited carriers are calcined. Furthermore, the shaped carriers are impregnated with an aqueous solution of the catalyst components, and then the impregnated carriers is separated from water, dried and calcined. However, in the preparation of the catalysts, a temperature at which the oxysulfur compound is never decomposed must be selected as a calcination temperature of the catalyst, in view of the starting materials.

One example of the procedure for preparing the catalyst is given below.

Definite amounts of the catalyst raw materials and carriers are sampled, and the catalyst raw materials are dissolved in water in accordance with the amount of the solution with which the carriers are to be impregnated, and then the carriers are impregnated with the solution, and picked up. The carriers are dried at 100° to 500° C, and then calcined at 300° to 600° C. Or, the carriers are placed in water, and the sampled catalyst raw materials are dissolved in the water. Then, the catalyst components are precipitated with a suitable precipitator, and filtered. The resulting cakes are dried and calcined in the same manner as above.

It is desirable that the content of the oxysulfur compound is 10% by weight or more on the basis of the weight of the catalyst in terms of sulfate ion.

Further, it is desirable that the metal component is 5% by weight or more, on the basis of the weight of the catalyst, in terms of its oxide. $NO_x$ can be removed with the catalyst of the present invention at any desired space velocity with a high efficiency.

The present process can make a boiler flue gas containing sulfur oxides, oxygen and nitrogen oxides harmless in a broader range of a space velocity of 1,000 to 100,000 $hr^{-1}$ in a broader temperature range than the prior art where the nitrogen oxides are made harmless with a catalyst of platinum group. The present process can attain a percent $NO_x$ reduction of 80% or more, and therefore a large volume of hot flue gas containing $NO_x$ and sulfur oxides such as a boiler flue gas from power stations can be treated in an industrial scale.

In the present invention, oxysulfur compounds of iron has the highest percent $NO_x$ reduction among other oxysulfur compounds. The highest percent $NO_x$ reduction can be also obtained when the non-oxysulfur compounds of iron are impregnated with a solution of non-metal oxysulfur compound. Especially when a catalyst of oxysulfur compounds of iron impregnated with a solution of non-metal oxysulfur compound is used, a percent $NO_x$ reduction of 85% or higher can be obtained.

Now, the present invention will be described in detail by way of Examples.

EXAMPLE 1

Example catalyst A was prepared by impregnating 23.7 g of active alumina in sizes of 10 to 20 meshes with a solution of 13.9 g of ferrous sulfate, $FeSO_4 \cdot 7H_2O$, in 10 ml of water, drying the impregnated active alumina at 120° C for 3 hours, and further calcining it at 400° C for 3 hours.

Comparative Example catalyst A was prepared with 20.2 g of ferric nitrate, $Fe(NO_3)_2 \cdot 9H_2O$ in the same manner as above.

Example catalyst A was sieved to 10 – 20 meshes, and these Example catalyst A and Comparative Example catalyst A were packed in reactor tubes having an inner diameter of 20 mm, respectively. Synthetic gas having the following composition similar to that of boiler flue gas was supplied, after being admixed with 250 ppm ammonia, to the catalyst layers at a flow rate of 2000 ml/minute (space velocity: 10,000 $hr^{-1}$), and relations between the catalyst temperature and the percent $NO_x$ reduction were determined as to the respective catalysts:

| NO | 300 ppm |
| $NO_2$ | 20 ppm |
| $SO_2$ | 500 ppm |
| $SO_3$ | 20 ppm |
| $O_2$ | 2% |
| $CO_2$ | 12.5% |
| Steam | 15% |
| $N_2$ | balance |

The results are given in FIG. 1, wherein it is evident that Example catalyst A containing the oxysulfur compound has a higher percent $NO_x$ reduction than Comparative Example catalyst A, and 80% or more of $NO_x$ is reduced at 300° C or higher.

EXAMPLE 2

This example shows that the percent $NO_x$ reduction is remarkably increased when various oxysulfur compounds are added to a catalyst containing no oxysulfur compound.

Example catalysts B – E were prepared by dipping Comparative Example catalyst A of Example 1 in an aqueous solutions of various oxysulfur compounds listed in Table 1 (concentration: 0.5 moles/l) for 10 minutes, drying the catalysts at 120° C for 3 hours and calcining them at 400° C for 3 hours.

The four catalysts thus prepared was subjected to the tests in the same manner as in Example 1, except that the reaction temperature of 350° C was employed, to determine the percent $NO_x$ reduction. The results are given in Table 1.

Table 1

| Example catalyst | Oxysulfur compound | Percent $NO_x$ reduction (%) |
|---|---|---|
| B | $H_2SO_4$ | 89 |
| C | $(NH_4)_2SO_4$ | 75 |
| D | $NH_4HSO_4$ | 82 |
| E | $NH_4HSO_3$ | 80 |

EXAMPLE 3

This example shows that compounds containing various oxysulfur compounds as an active catalyst component can be used.

Example catalysts F – I were prepared by impregnating active alumina of 10 – 20 meshes with a solution of various oxysulfur compounds as listed in Table 2 in 10 ml of water, drying the impregnated alumina at 120° C for 3 hours, and further calcining then at 400° C for 3 hours.

The four catalysts thus prepared were subjected to the tests under the same conditions as in Example 2, and the results are given in Table 2, where it is evident that both ferrous salts and ferric salt can be used as active catalyst components, but especially ferrous salts have a higher percent $NO_x$ reduction.

Table 2

| Example catalyst | Oxysulfur compound | Sample amount | Percent $NO_x$ reduction (%) |
|---|---|---|---|
| F | $FeSO_4 \cdot 7H_2O$ | 6.9 | 84 |
| G | $FeSO_4 \cdot (NH_4)_2SO_4 \cdot 6H_2O$ | 9.8 | 80 |
| H | $Fe_2(SO_4)_3 \cdot (NH_4)_2SO_4 \cdot 29H_2O$ | 12.1 | 72 |
| I | Pickling sulfate ($FeSO_4 \cdot 7H_2O$) | 6.9 | 91 |

EXAMPLE 4

This example shows that the effect of oxysulfur compound is remarkable even in combination of catalyst metals of iron and copper or vanadium with the oxysulfur compound.

Catalysts P and Q were prepared by sampling 10.1 g of ferrous nitrate and 3.5 g of vanadyl chloride, and 10.1 g of ferrous nitrate and 5.6 g of copper nitrate, impregnating active alumina with these sampled catalyst components, respectively, drying and calcining them in the same manner as in Example 1, then dipping the catalysts in 0.5 moles/l of sulfuric acid for 10 minutes, drying the catalysts at 120° C for 3 hours, and calcining them at 400° C for 3 hours. The catalysts P and Q were subjected to the tests in the same manner as in Example 1, except that a temperature of 350° C was used, to determine the percent $NO_x$ reduction. The results are given in Table 3.

Table 3

| | First component | | Second component | | Percent $NO_x$ reduction | |
|---|---|---|---|---|---|---|
| Example catalyst | Molecular formula | Amount sampled (g) | Molecular formula | Amount sampled (g) | Before impregnation with $H_2SO_4$ | After impregnation with $H_2SO_4$ |
| P | $Fe(NO_3)_2 \cdot 9H_2O$ | 10.1 | $VOCl_2$ | 3.5 | 35 | 58 |
| Q | $Fe(NO_3)_2 \cdot 9H_2O$ | 10.1 | $Cu(NO_3)_2$ | 5.6 | 90 | 96 |

The combination of ferrous nitrate and vanadyl chloride has a lower percent $NO_x$ reduction, but in the case of ferrous nitrate and vanadyl chloride, the best percent $NO_x$ reduction is obtained at atomic ratio of iron to vanadium of 1 : 1 and reaches even 90%. In the foregoing example, the percent $NO_x$ reduction is low even after the impregnation with sulfuric acid, because the composition of catalyst components of low percent $NO_x$ reduction was used as the starting materials, but the increase in the percent $NO_x$ reduction by the impregnation with sulfuric acid was 23%. It is evident that the effect of impregnation with sulfuric acid is remarkable.

The effect of oxysulfur compound was observed in combinations of copper, chromium, etc. For example, a catalyst based on a combination of copper and manganese had a percent $NO_x$ reduction of 51% before the impregnation with sulfuric acid, but had that of 80% after the impregnation with sulfuric acid.

EXAMPLE 5

This example shows that the same effect of the oxysulfur compound appears even with catalysts prepared by precipitation, as with the catalysts prepared by impregnation.

Example catalysts R – T and Comparative Example catalysts B and C were prepared by slowly adding 350 ml of 3N ammonia to solutions of various sulfates or nitrates listed in Table 4 in 3l of water with stirring, thereby forming precipitates, washing the precipitates several times, filtering the precipitates, drying the resulting cakes at 120° C for 3 hours, pulverizing and calcining the cakes at 400° C for 3 hours, then pulverizing the cakes, shaping the resulting powders into pellets having a diameter of 6 mm and thickness of 4 mm under a pressure of 2000 kg/cm², again disintegrating pellets and sieving disintegrated granules to 10 – 20 meshes.

The five catalysts thus prepared were subjected to the tests in the same manner as in Example 2 to determine the percent $NO_x$ reduction. The results are given in Table 4.

Table 4

| Example catalyst | Test compound | Amount sampled (g) | Percent $NO_x$ reduction (%) | Comparative Example catalyst | Test compound | Amount sampled (g) | Percent $NO_x$ reduction (%) |
|---|---|---|---|---|---|---|---|
| R | $FeSO_4 \cdot 7H_2O$ | 139 | 73 | B | $Fe(NO_3)_3 \cdot 9H_2O$ | 202 | 29 |
| S | pickling sulfate ($FeSO_4 \cdot 7H_2O$) | 139 | 81 | | | | |
| T | $CuSO_4 \cdot 5H_2O$ | 125 | 66 | C | $Cu(NO_3)_2 \cdot 3H_2O$ | 121 | 43 |

Catalysts prepared by kneading powders of iron oxide, $Fe_2O_3$, with a waste pickling sulfuric acid liquor, and drying and calcining the resulting mixture also had a percent $NO_x$ reduction, when tested under the same conditions as in Example 2.

EXAMPLE 6

This example shows that the activity of the catalyst of the present invention is in a close relation with the amount of oxysulfur compound contained in the catalyst.

Example catalysts V – Z were prepared in the same manner as for the Example catalyst A in Example 1, except that only the calcination temperature was varied between 200° and 800° C. The six catalysts thus prepared and Example catalyst A were subjected to the tests under the same conditions as in Example 2 to determine the percent $NO_x$ reduction, and also the sulfur content of the catalysts were measured by coulometry to investigate a relation to the percent $NO_x$ reduction.

Figure 2:
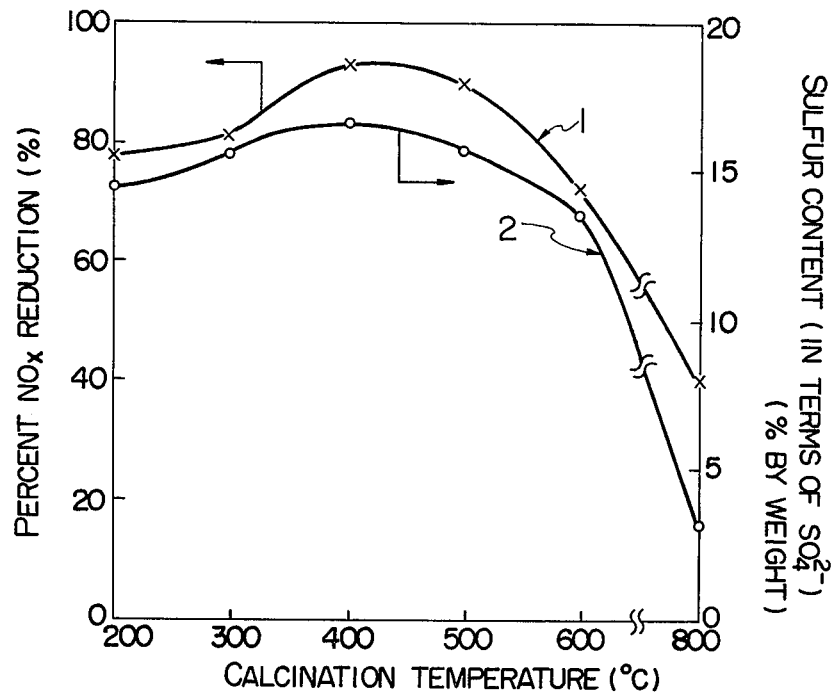
FIG. 2 is a diagram showing the relations among calcination temperature, percent $NO_x$ reduction and sulfur content of the catalyst used in the present invention.

The results are given in FIG. 2, wherein the curve 1 shows relations between the percent $NO_x$ reduction and the calcination temperature, and the curve 2 relations between the sulfur content and the calcination temperature. The composition of test flue gas and the amount of ammonia added were identical with those of Example 1. It is seen that there is a close relation between the percent $NO_x$ reduction and the sulfur content. When the calcination temperature exceeds 600° C, the sulfate ions are decomposed, and consequently the percent $NO_x$ reduction is greatly lowered. Preferable sulfur content is 10% by weight or more in the terms of sulfate ions ($SO_4^{--}$).

EXAMPLE 7

This example shows that the catalyst of the present invention can maintain a sufficiently stable and high activity of $NO_x$ reduction in life tests carried out for a long period of time without poisoning of the coexisting sulfur oxides, as compared with the conventional platinum catalyst (Comparative Example Catalyst E).

Comparative Example catalyst E was prepared by dissolving 5 ml of an aqueous solution of hexachloroplatinic acid (10 g/100 cc in terms of platinum) in water to make total 40 ml, impregnating 100 g of active alumina of 10 – 20 meshes with the resulting solution, drying the impregnated alumina at 120° C for 5 hours, and calcined and reduced in a hydrogen gas stream at 450° C for 3 hours. Comparative Example catalyst E had 0.5% by weight of platinum on the basis of the basis of the weight of the catalyst.

Figure 3:
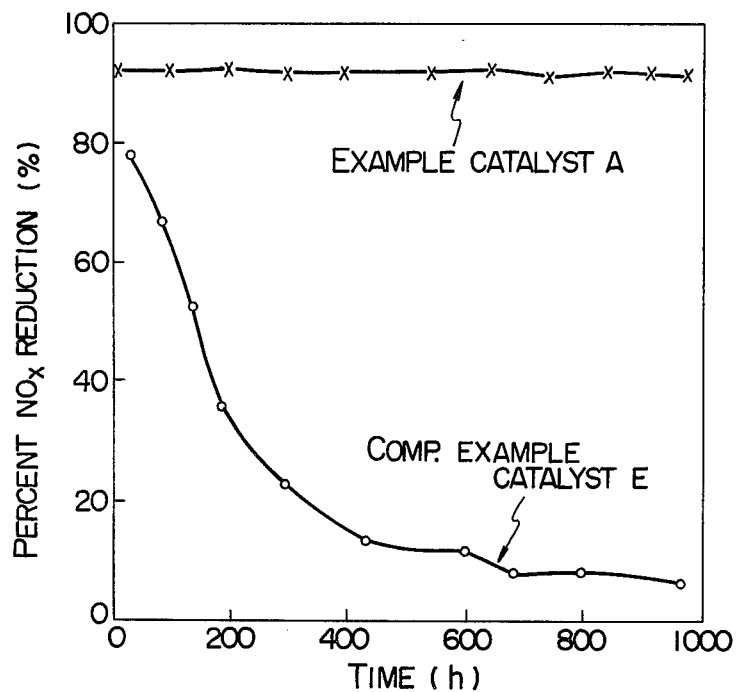
FIG. 3 is a diagram showing the changes of the percent $NO_x$ reduction with time of the catalyst used in the present invention, and that of the prior art.

The platinum catalyst thus prepared and Example catalyst A were subjected to the life tests of 1,000 hours under the same conditions as in Example 2. The results are shown in FIG. 3, wherein it is evident that the catalyst of the present invention can maintain a high and stable percent $NO_x$ reduction without any lowering of the activity.

EXAMPLE 9

The present example shows the relation between the space velocity and percent $NO_x$ reduction of Example catalyst A of the present invention.

Figure 4:
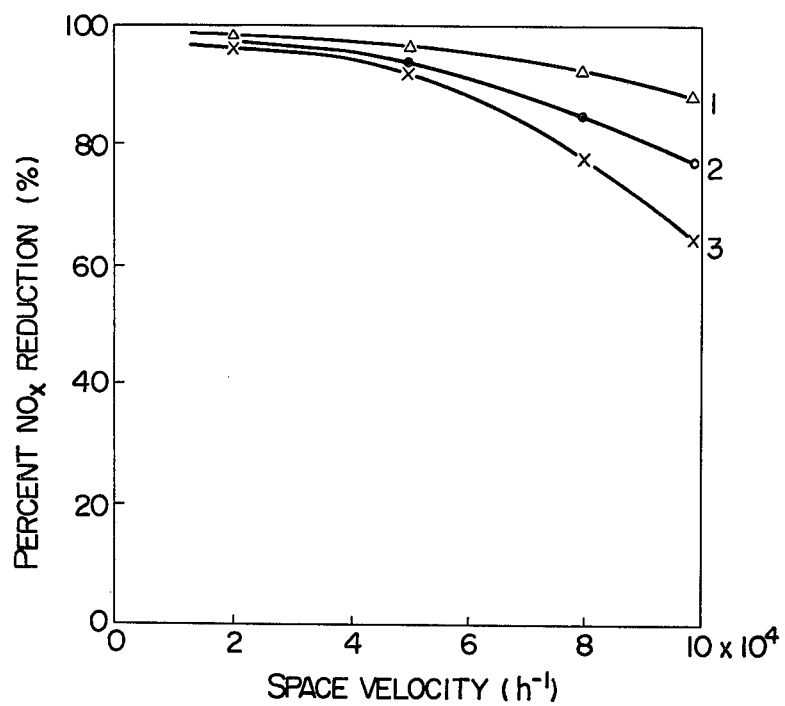
FIG. 4 is a diagram showing the relations between the percent $NO_x$ reduction and space velocity of the catalyst used in the present invention by way of the amount of ammonia added as parameter.

Relations between the space velocity and percent $NO_x$ reduction were investigated by way of ammonia concentration as a parameter, using Example catalyst A. Other test conditions were the same as in Example 2. The results are shown in FIG. 4, wherein the curve 1 shows an ammonia amount of 2,000 ppm, the curve 2 1,000 ppm and the curve 3 250 ppm. It is evident that 88% at $NO_x$ can be reduced even at a space velocity of 100,000 $hr^{-1}$ in the case of ammonia concentration of 2,000 ppm.

What is claimed is:

1. In a process for removing nitrogen oxides from a flue gas wherein the flue gas is contacted with ammonia in the presence of a catalyst at elevated temperatures to reduce the nitrogen oxides to nitrogen, the improvement wherein said flue gas contains 100 to 1000 ppm in volume of nitrogen oxides, 200 to 1500 ppm in volume of sulfur oxides and 1 to 7% by volume of oxygen, the flue gas is mixed with ammonia gas in an amount of more than equivalents of nitrogen oxides, and the flue gas and ammonia mixture is contacted with a catalyst initially containing at least one metallic atom M selected from the group consisting of Fe, Cu, V, Mn, Ni, and Cr, and a group $SO_x$, wherein $x$ is 1.5 to 4.

2. A process according to claim 1, wherein the catalyst is carried on heat-resistant, porous carriers.

3. A process according to claim 1, wherein the flue gas and ammonia mixture is contacted with the catalyst in a temperature range at which ammonia reacts with the nitrogen oxides, but below a decomposition temperature of $SO_x$, and a space velocity of 1,000 to 100,000 $hr^{-1}$.

4. A process according to claim 1, wherein the catalyst containing at least 5% by weight of the metal atom in terms of its oxide and at least 10% by weight of the group $SO_x$ in terms of $SO_4^{--}$, on the basis of the weight of the catalyst.

5. In a process for removing nitrogen oxides from a flue gas wherein the flue gas is contacted with ammonia in the presence of a catalyst at elevated temperatures to reduce the nitrogen oxides to nitrogen, the improvement wherein said flue gas contains 100 to 1000 ppm in volume of nitrogen oxides, 200 to 1500 ppm in volume of sulfur oxides and 1 to 7% by volume of oxygen, the flue gas is mixed with ammonia gas in an amount of more than equivalents of nitrogen oxides, and then the flue gas and ammonia mixture is contacted with a catalyst prepared by mixing a compound MY, where M is at least one metal selected from the group consisting of Fe, Cu, V, Mn, Ni, and Cr, and Y is an atom or group other than $SO_x$, and a compound $ASO_x$, where A is a cation other than said M and $x$ is 1.5 to 4, and calcining the resulting mixture at a temperature of not more than 600° C.

6. The process according to claim 5, wherein Y is an anion.

7. The process according to claim 5, wherein Y is an oxygen atom.

8. The process according to claim 5, wherein the catalyst is prepared by impregnating a heat-resistant, porous carrier with a solution of materials consisting of the compound MY and the compound $ASO_x$ and calcining the impregnated carrier at a temperature of not more than 600° C.

9. The process according to claim 5, wherein the metallic atom M of the catalyst is at least 5% by weight on the basis of the weight of the catalyst in terms of its oxide, and $SO_x$ is at least 10% by weight on the basis of the weight of the catalyst in terms of sulfate ion.

10. The process according to claim 5, wherein the compound MY is at least one of ferrous nitrate, manganese nitrate, ferrous oxide, ferric oxide, vanadyl chloride and ferric nitrate, and the compound $ASO_x$ is at least one of sulfuric acid, ammonium sulfate and ammonium hydrogen sulfate.

11. In a process for removing nitrogen oxides from a flue gas wherein the flue gas is contacted with ammonia in the presence of a catalyst at elevated temperatures to reduce the nitrogen oxides to nitrogen, the improvement wherein said flue gas contains 100 to 1000 ppm in volume of nitrogen oxides, 200 to 1500 ppm in volume of sulfur oxides and 1 to 7% by volume of oxygen, the flue gas is mixed with ammonia gas in an amount of more than equivalents of nitrogen oxides, and then the flue gas and ammonia mixture is contacted with a catalyst prepared by calcining a compound $MSO_x$, where M is at least one metal selected from the group consisting of Fe, V, Cr, Mn, Ni, and Cu and $x$ is 1.5 to 4, at a temperature of not more than 600° C.

12. The process according to claim 11, wherein the compound $MSO_x$ is ferrous sulfate which is impregnated as an aqueous solution on an alumina carrier and the impregnated carrier is calcined in air at 300°–600° C., said catalyst containing at least 10% of $SO_4^{--}$ and at least 5% of Fe in terms of $Fe_2O_3$, based on the weight of the catalyst.

13. The process according to claim 11, wherein the compound $MSO_x$ is at least one of ferrous sulfate, ferric sulfate, and ferrous ammonium sulfate.

14. In a process for removing nitrogen oxides from a flue gas wherein the flue gas is contacted with ammonia in the presence of a catalyst at elevated temperatures to reduce the nitrogen oxides to nitrogen, the improvement wherein said flue gas contains 100 to 1000 ppm in volume of nitrogen oxides, 200 to 1500 ppm in volume of sulfur oxides and 1 to 7% by volume of oxygen, the flue gas is mixed with ammonia gas in an amount of more than equivalents of nitrogen oxides, and then the flue gas and ammonia mixture is contacted with a catalyst prepared by mixing a compound $MSO_x$, where M is at least one metal selected from the group consisting of Fe, Cu, V, Mn, Ni, and Cr and $x$ is 1.5 to 4, and a compound MY, in which M is said at least one metal, and Y is an anion other than $SO_x$, and calcining the resulting mixture at a temperature of not more than 600° C.

15. The process according to claim 14, wherein the compound $MSO_x$ is ferrous sulfate and the compound MY is at least one of cuprous nitrate, ferrous nitrate, vanadyl chloride and manganese nitrate.

16. In a process for removing nitrogen oxides from a flue gas wherein the flue gas is contacted with ammonia in the presence of a catalyst at elevated temperatures to reduce the nitrogen oxides to nitrogen, the improvement wherein said flue gas contains 100 to 1000 ppm in volume of nitrogen oxides, 200 to 1500 ppm in volume of sulfur oxides and 1 to 7% by volume of oxygen, the flue gas is mixed with ammonia gas in an amount of more than equivalents of nitrogen oxides, and then the flue gas and ammonia mixture is contacted with a catalyst prepared by mixing a compound $MSO_x$, where M is at least one metal selected from the group consisting of Fe, Cu, V, Mn, Ni, and Cr and $x$ is 1.5 to 4, and a compound $ASO_x$, where A is at least one cation selected from the group consisting of $NH_4^+$, and $H^+$, and $x$ is 1.5 to 4, and calcining the resulting mixture at a temperature of not more than 600° C.

17. The process according to claim 16, wherein the resulting mixture is supported on a heat-resistant, porous carrier prior to calcining.

18. The process according to claim 5, wherein said flue gas also contains 8 to 15% by volume of carbon dioxide, and 5 to 15% by volume of steam.

19. A process according to claim 1, wherein the $SO_x$ group is selected from the group consisting of sulfate ion, bisulfate ion, sulfite ion, acidic bisulfite ion, thiosulfate ion, and pyrosulfate ion.

20. A process according to claim 1, wherein the catalyst has been calcined at a temperature at which the group $SO_x$ is not decomposed.

* * * * *